US012754499B2

(12) United States Patent
Kitami

(10) Patent No.: US 12,754,499 B2
(45) Date of Patent: Oct. 6, 2026

(54) IMAGE FORMING APPARATUS

(71) Applicant: SHARP KABUSHIKI KAISHA, Sakai City (JP)

(72) Inventor: Kenji Kitami, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/964,857

(22) Filed: Dec. 2, 2024

(65) Prior Publication Data

US 2025/0189913 A1 Jun. 12, 2025

(30) Foreign Application Priority Data

Dec. 8, 2023 (JP) ................................ 2023-207331

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/657* (2013.01); *G03G 2215/00772* (2013.01); *G03G 2215/2074* (2013.01)

(58) Field of Classification Search
CPC ............ G03G 15/205; G03G 15/2064; G03G 15/657; G03G 2215/00772; G03G 2215/2074; G03G 2215/00776; G03G 21/20; G03G 21/203
See application file for complete search history.

(56) References Cited

U.S. PATENT DOCUMENTS

2017/0343938 A1* 11/2017 Tadomi .............. G03G 15/6573
2019/0087138 A1* 3/2019 Suzuki .................. G06F 3/1208

FOREIGN PATENT DOCUMENTS

JP 2017-026651 A 2/2017

* cited by examiner

*Primary Examiner* — Sevan A Aydin
(74) *Attorney, Agent, or Firm* — ScienBiziP, P.C.

(57) ABSTRACT

An image forming apparatus includes a heat source, a fixing belt that is heated by the heat source to thermally fix a color material to each of a plurality of pieces of paper in sequence, an operation acceptor that allows a user to specify a fixation degree of the color material for the plurality of pieces of paper, and one or more controllers that cause each of the plurality of pieces of paper to pass through the fixing belt in sequence at a control paper feed amount which is a paper feed amount per unit time according to the fixation degree.

9 Claims, 16 Drawing Sheets

514

| | FIXATION DEGREE | 1 | 2 | 3 | 4 | 5 |
|---|---|---|---|---|---|---|
| | AMOUNT OF TEMPERATURE CHANGE | 0~5℃ | 6~10℃ | 11~15℃ | 16~20℃ | 21℃~ |
| NN ENVIRONMENT /HH ENVIRONMENT | PLAIN PAPER | 95% | 90% | 75% | 60% | 50% |
| | THICK PAPER, SPECIAL PAPER | 95% | 95% | 90% | 80% | 70% |
| | ENVELOPE | 95% | 95% | 90% | 80% | 70% |
| | THIN PAPER | ... | ... | ... | ... | ... |
| | RECYCLED PAPER | ... | ... | ... | ... | ... |
| | GLOSSY PAPER | ... | ... | ... | ... | ... |
| | EMBOSSED PAPER | ... | ... | ... | ... | ... |
| | OHP | ... | ... | ... | ... | ... |
| LL ENVIRONMENT | PLAIN PAPER | 75% | 70% | 55% | 40% | 30% |
| | THICK PAPER, SPECIAL PAPER | 75% | 75% | 70% | 60% | 50% |
| | ENVELOPE | 75% | 75% | 70% | 60% | 50% |
| | THIN PAPER | ... | ... | ... | ... | ... |
| | RECYCLED PAPER | ... | ... | ... | ... | ... |
| | GLOSSY PAPER | ... | ... | ... | ... | ... |
| | EMBOSSED PAPER | ... | ... | ... | ... | ... |
| | OHP | ... | ... | ... | ... | ... |

FIG. 6

514

| | FIXATION DEGREE | 1 | 2 | 3 | 4 | 5 |
|---|---|---|---|---|---|---|
| | AMOUNT OF TEMPERATURE CHANGE | 0～5℃ | 6～10℃ | 11～15℃ | 16～20℃ | 21℃～ |
| NN ENVIRONMENT /HH ENVIRONMENT | PLAIN PAPER | 95% | 90% | 75% | 60% | 50% |
| | THICK PAPER, SPECIAL PAPER | 95% | 95% | 90% | 80% | 70% |
| | ENVELOPE | 95% | 95% | 90% | 80% | 70% |
| | THIN PAPER | ··· | ··· | ··· | ··· | ··· |
| | RECYCLED PAPER | ··· | ··· | ··· | ··· | ··· |
| | GLOSSY PAPER | ··· | ··· | ··· | ··· | ··· |
| | EMBOSSED PAPER | ··· | ··· | ··· | ··· | ··· |
| | OHP | ··· | ··· | ··· | ··· | ··· |
| LL ENVIRONMENT | PLAIN PAPER | 75% | 70% | 55% | 40% | 30% |
| | THICK PAPER, SPECIAL PAPER | 75% | 75% | 70% | 60% | 50% |
| | ENVELOPE | 75% | 75% | 70% | 60% | 50% |
| | THIN PAPER | ··· | ··· | ··· | ··· | ··· |
| | RECYCLED PAPER | ··· | ··· | ··· | ··· | ··· |
| | GLOSSY PAPER | ··· | ··· | ··· | ··· | ··· |
| | EMBOSSED PAPER | ··· | ··· | ··· | ··· | ··· |
| | OHP | ··· | ··· | ··· | ··· | ··· |

FIG. 16

514

| FIXATION DEGREE | 1 | 2 | 3 | 4 | 5 |
|---|---|---|---|---|---|
| PAPER FEED INTERVAL CONTROL VALUE | 95% | 90% | 85% | 80% | 70% |

IMAGE FORMING APPARATUS

CROSS-REFERENCE TO RELATED APPLICATION

The present application claims priority from Japanese Application JP2023-207331, filed on Dec. 8, 2023, the content of which is hereby incorporated by reference into this application.

BACKGROUND

1. Field

The present disclosure relates to an image forming apparatus.

2. Description of the Related Art

The prior art discloses an image forming apparatus in which a user can switch between a standard mode and an environmental mode, and when the environmental mode is selected, the drive control of multiple heaters that heat the heating roller is changed to lower the temperature of the end regions of the heating roller.

SUMMARY

In the image forming apparatus disclosed in the prior art, when fixation to a piece of paper is difficult due to surface properties of the paper or the like, the fixation is achieved by increasing the fixation temperature. However, when pieces of paper having a relatively smaller size than the fixing belt are continuously passed through the fixing belt, an excessive temperature rise occurs in the non-paper-passing regions of the fixing belt due to an increase in the fixing temperature, and the fixing belt may be damaged. In view of the above, an object of one aspect of the present disclosure is to provide an image forming apparatus that can achieve the fixation of a color material, while ensuring safety.

An image forming apparatus according to one embodiment of the present disclosure includes a heat source, a fixing belt that is heated by the heat source to thermally fix a color material to each of a plurality of pieces of paper in sequence, an operation acceptor that allows a user to set a fixation degree for fixation of the color material to the plurality of pieces of paper, and one or more controllers that pass each of the plurality of pieces of paper through the fixing belt in sequence at a control paper feed amount representing a paper feed amount per unit time according to the fixation degree.

BRIEF DESCRIPTION OF THE DRAWINGS

FIG. 6 is a diagram illustrating an example of control management information.

FIG. 16 is a diagram illustrating an example of control management information according to a modification of the first embodiment.

DETAILED DESCRIPTION OF THE DISCLOSURE

First Embodiment

Figure 1:
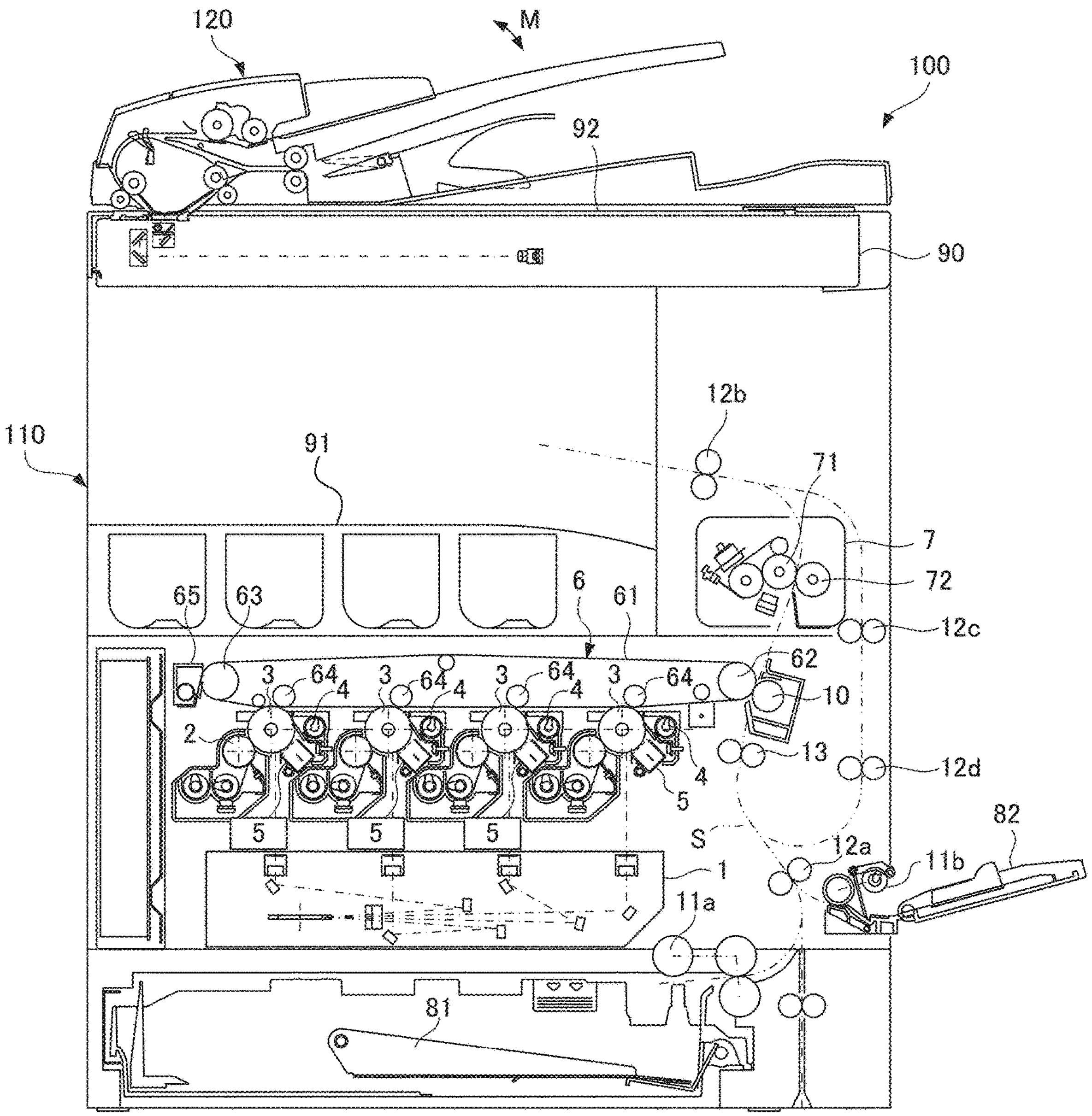
FIG. 1 is a diagram illustrating an example of a structure of an image forming apparatus.

A first embodiment is described with reference to FIG. 1 to FIG. 15. Note that, in the drawings, the same or similar elements are denoted by the same reference numerals, and duplicated description thereof is omitted.

FIG. 1 is a diagram illustrating an example of a structure of an image forming apparatus 100.

The image forming apparatus 100 forms multi-color and monochrome images on a piece of paper in accordance with document data transmitted from the outside, and is configured by an apparatus main body 110 and an automatic document processor 120. The apparatus main body 110 is configured by including an exposer 1, a developer 2, a photosensitive drum 3, a cleaner 4, a charger 5, an intermediate transfer belt 6, a fixer 7, a paper feed cassette 81, a paper discharge tray 91, and the like.

A document placement table 92 made of transparent glass on which a document is placed is provided on the upper part of the apparatus main body 110, and the automatic document processor 120 is attached on the upper side of the document placement table 92. The automatic document processor 120 automatically transports the document onto the document placement table 92. Further, the automatic document processor 120 is rotatably configured, allowing a document to be manually placed on the document placement table 92 by turning the automatic document processor 120.

For example, image data processed by the image forming apparatus 100 correspond to a color image using the colors, black (K), cyan (C), magenta (M), and yellow (Y). In this case, four pieces of the developers 2, photosensitive drums 3, chargers 5, and cleaners 4 are provided for forming four types of latent images corresponding to each color. Each set is used for black, cyan, magenta, and yellow to constitute four image stations.

The charger 5 is for uniformly charging the surface of the photosensitive drum 3 to a predetermined potential. In addition to a charger type as shown in FIG. 1, a contact roller type or brush type charger may be used.

The exposer 1 is configured as a laser scanning unit (LSU) equipped with a laser emitter, a reflecting mirror, and the like. In the exposer 1, optical elements such as a polygon mirror that scans a laser beam, and a lens and a mirror that guide the laser light reflected by the polygon mirror to the photosensitive drum 3 are disposed. Further, the exposer 1 may be configured by, for example, an EL or LED writing head in which light emitting elements are arranged in an array.

The exposer 1 has a function of exposing the charged photosensitive drum 3 to light in accordance with image data represented by each of a plurality of print pages included in a print job, thereby forming an electrostatic latent image on the surface of the photosensitive drum 3 in accordance with the image data. The developer 2 develops the electrostatic latent image formed on each of the photosensitive drums 3 into a visible image with black, cyan, magenta or yellow toner. Further, the cleaner 4 removes and collects the toner remaining on the surface of the photosensitive drum 3 after development and image transfer.

The intermediate transfer belt 6 disposed above the photosensitive drums 3 includes an intermediate transfer belt 61, an intermediate transfer belt driving roller 62, an intermediate transfer belt driven roller 63, intermediate transfer rollers 64, and an intermediate transfer belt cleaner 65. The intermediate transfer rollers 64 are provided at four positions corresponding to each color, black, cyan, magenta, and yellow.

The intermediate transfer belt driving roller 62, the intermediate transfer belt driven roller 63, and the intermediate transfer rollers 64 stretch the intermediate transfer belt 61 and drive the rotation of the intermediate transfer belt 61. Further, each intermediate transfer roller 64 applies a transfer bias for transferring the toner image on the photosensitive drum 3 onto the intermediate transfer belt 61.

The intermediate transfer belt 61 is disposed so as to be in contact with each of the photosensitive drums 3. The toner images of each color formed on the photosensitive drums 3 are transferred onto the intermediate transfer belt 61 in a sequential manner to be superimposed on each other, thereby achieving a function of forming a multi-color toner image on the intermediate transfer belt 61.

The toner images are transferred from the photosensitive drums 3 to the intermediate transfer belt 61 by the intermediate transfer rollers 64 which are in contact with the back side of the intermediate transfer belt 61. Each of the intermediate transfer rollers 64 is a roller whose surface is covered with a conductive elastic material. Examples of the conductive elastic material include EPDM and urethane foam. The conductive elastic material allows a high voltage to be applied uniformly to the intermediate transfer belt 61. In the present disclosure, a roller-shaped transfer electrode is used. However, a brush shape or the like can be used in addition to the roller shape.

The electrostatic latent images developed and visualized on the photosensitive drums 3 according to each hue are superimposed on the intermediate transfer belt 61. Then, the toner image is transferred onto a piece of paper 201 by a transfer roller 10 disposed at the contact position between the paper and the intermediate transfer belt 61 as the intermediate transfer belt 61 rotates.

In this process, the intermediate transfer belt 61 and the transfer roller 10 are pressed against each other at a predetermined nip, and a voltage for transferring the toner onto the paper 201 is applied to the transfer roller 10. Further, regarding the transfer roller 10, for steadily obtaining the nip, either the transfer roller 10 or the intermediate transfer belt driving roller 62 is made of a hard material, and the other is made of a soft material such as an elastic roller. Examples of the hard material include a metal. Further, examples of the soft material include an elastic rubber roller and a foam roller.

Further, the toner that is adhered to the intermediate transfer belt 61 having contacted the photosensitive drums 3, or the toner that remains on the intermediate transfer belt 61 without being transferred onto the paper 201 by the transfer roller 10, may cause toner color mixing in the next step. Thus, such toner is set to be removed and collected by the intermediate transfer belt cleaner 65. The intermediate transfer belt cleaner 65 is in contact with the intermediate transfer belt 61. For example, a cleaning blade is provided as a cleaning member, and the intermediate transfer belt 61 with which the cleaning blade comes into contact is supported by the intermediate transfer belt driven roller 63 from the back side.

The paper feed cassette 81 is a tray for storing the pieces of paper to be used for image formation, and is provided on the lower side of the exposer 1 of the apparatus main body 110.

Further, the paper 201 used for image formation can be placed in a manual paper feed cassette 82. Further, the paper discharge tray 91 provided above the apparatus main body 110 is a tray for storing the printed pieces of paper 201 in a face down manner.

Further, the apparatus main body 110 is also provided with a substantially vertical shaped paper transport path S for transporting the paper 201 from the paper feed cassette 81 and the manual paper feed cassette 82 to the paper discharge tray 91 via the transfer roller 10 and the fixer 7. Near the paper transport path S from the paper feed cassette 81 or the manual paper feed cassette 82 to the paper discharge tray 91, pickup rollers 11*a* and 11*b*, a plurality of transport rollers 12*a* to 12*d*, a registration roller 13, the transfer roller 10, the fixer 7, and the like are disposed.

The transport rollers 12*a* to 12*d* are small rollers for facilitating and assisting the transport of paper, and multiple transport rollers are provided along the paper transport path S. Further, the pickup roller 11*a* is provided near an end of the paper feed cassette 81, and picks up the paper one by one from the paper feed cassette 81 and supplies the paper to the paper transport path S. Similarly, the pickup roller 11*b* is provided near an end of the manual paper feed cassette 82, and picks up the paper one by one from the manual paper feed cassette 82 and supplies the paper to the paper transport path S.

Further, the registration roller 13 temporarily holds the paper being transported along the paper transport path S. Then, the registration roller 13 allows the paper to be transported to the transfer roller 10 at a timing when the leading edge of the toner image on the photosensitive drum 3 and the leading edge of the paper are aligned.

Next, the paper transport path S is described in detail. As described above, the image forming apparatus 100 is provided with the paper feed cassette 81 for storing the paper 201 in advance, and the manual paper feed cassette 82. For feeding the pieces of paper from these paper feed cassettes 81 and 82, the pickup rollers 11*a* and 11*b* are provided for the paper feed cassettes 81 and 82, respectively, and the pieces of paper are guided to the paper transport path S one by one.

The paper transported from each of the paper feed cassettes 81 and 82 is transported to the registration roller 13 by the transport roller 12*a* on the paper transport path S, and transported to the transfer roller 10 at the timing when the leading edge of the paper and the leading edge of the image information on the intermediate transfer belt 61 are aligned, so that the image information is written onto the paper. Then, the paper passes through the fixer 7, where the unfixed toner on the paper is melted and fixed by heat, and is discharged onto the paper discharge tray 91 via the transport roller 12*b* disposed behind the fixer 7.

The paper transport path S has been described in a case where single-sided printing is requested on the paper. On the other hand, when double-sided printing is requested, after the single-sided printing is completed as described above, the rear edge of the paper that has passed through the fixer 7 is held by the final transport roller 12*b*. The paper is then guided to the transport rollers 12*c* and 12*d* by the transport roller 12*b* rotating in the reverse direction. Thereafter, the paper passes through the registration roller 13 to be printed on the back side of the paper and is then discharged onto the paper discharge tray 91.

Figure 2:
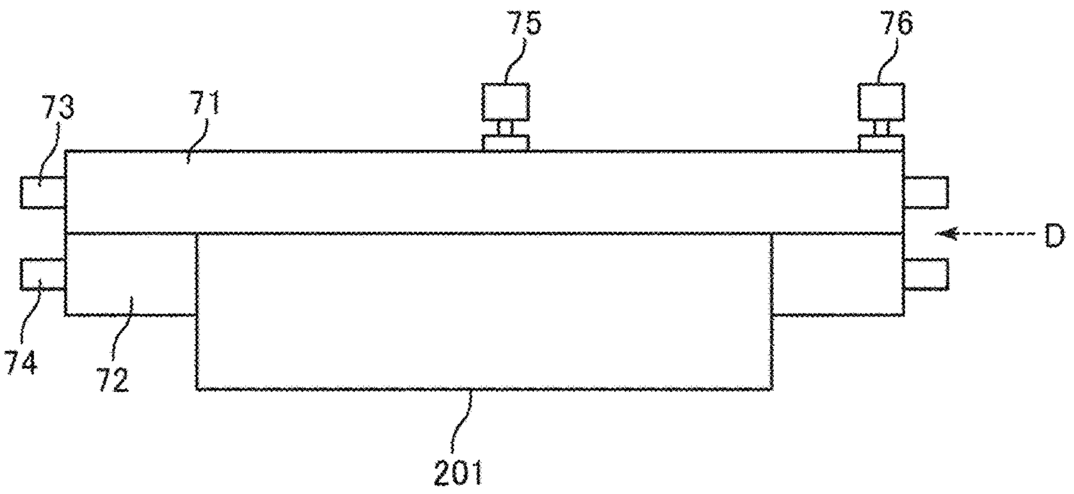
FIG. 2 is a front view illustrating an example of a configuration of a fixer.
Figure 3:
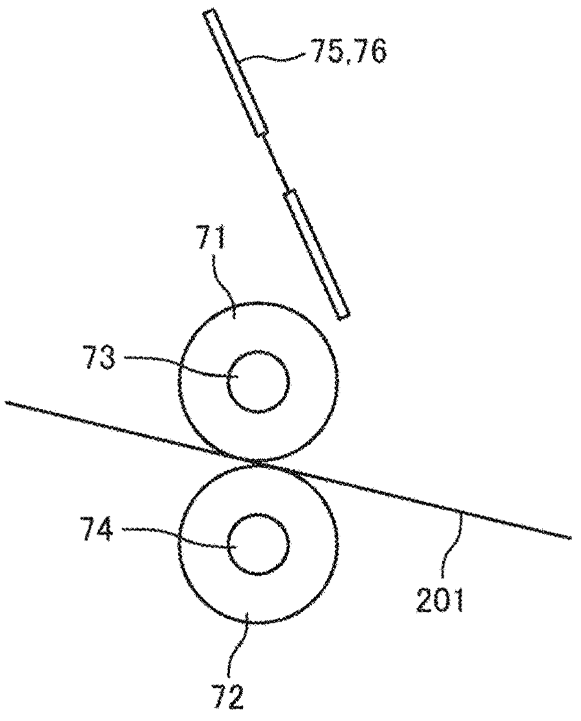
FIG. 3 is a side view taken along an arrow D in FIG. 2.
Figure 4:
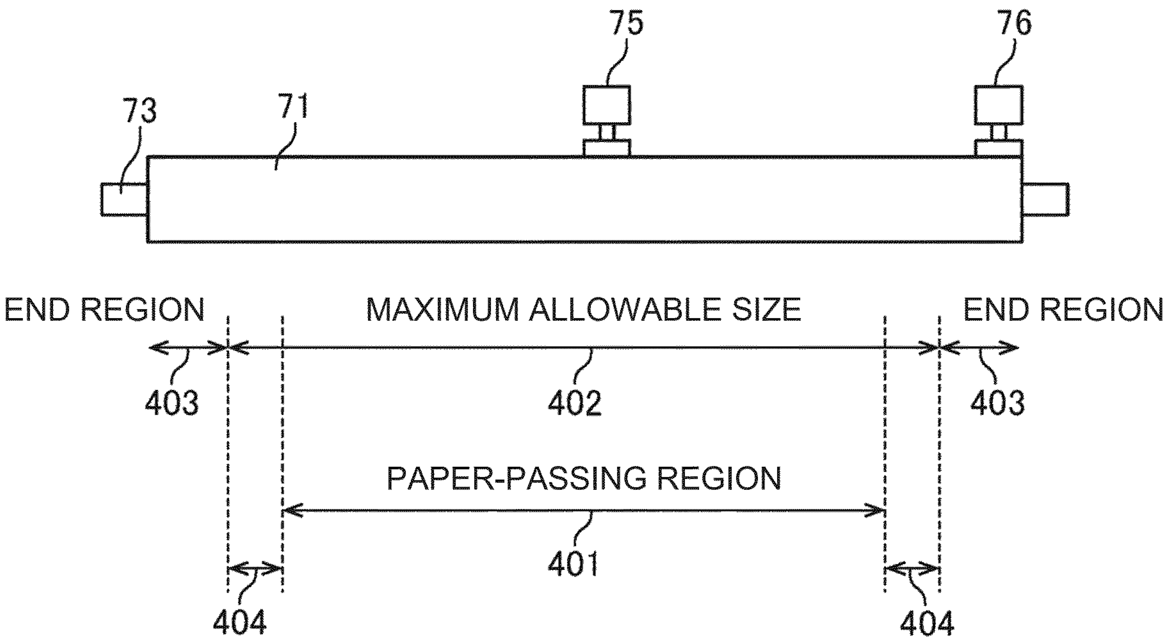
FIG. 4 is a schematic diagram of a paper-passing region, a maximum allowable size, end regions, and regions inside the maximum allowable size and outside the paper-passing region.

Next, the fixer 7 is described in detail with reference to FIG. 2 to FIG. 4. FIG. 2 is a front view illustrating an example of a configuration of the fixer 7. FIG. 3 is a side view taken along an arrow D in FIG. 2. FIG. 4 is a schematic diagram illustrating a paper-passing region 401 through which the paper 201 passes, end regions 403 which are outside a maximum allowable size 402, and regions 404 which are inside the maximum allowable size 402 and outside the paper-passing region 401, on the fixing belt 71. The end regions 403 and the regions 404 are non-paper-passing regions through which the paper 201 does not pass.

The fixer 7 includes the fixing belt 71, a pressure roller 72, a heat source 73, a core material 74, a first temperature detector 75, and a second temperature detector 76.

The heat source 73 generates heat at a specified target temperature. The fixing belt 71 is heated by the heat source 73 to thermally fix a color material onto each of a plurality of pieces of paper 201 in sequence. Specifically, the fixing belt 71, together with the pressure roller 72, heat-pressure-bonds toner, which is the color material, onto each of the plurality of pieces of paper 201, thereby melting, mixing, and pressure-bonding a multi-color toner image transferred to each of the plurality of pieces of paper 201. As a result, the multi-color toner image is thermally fixed to each of the multiple pieces of paper 201 in sequence.

The pressure roller 72 is configured such that a heat-resistant elastic material is provided on the outer peripheral surface of the core material 74 made of iron, stainless steel, aluminum, or the like. The pressure roller 72 is pressed against the fixing belt 71 by an elastic member such as a spring, not shown. As a result, a nip of a predetermined width is formed between the fixing belt 71 and the pressure roller 72.

The fixing belt 71 and the pressure roller 72 rotate with the paper 201 sandwiched between them.

The heat source 73 heats the fixing belt 71. The heat source 73 is provided inside the fixing belt 71 and disposed along the axial direction of the fixing belt 71. For example, the heat source 73 is a halogen heater.

The first temperature detector 75 detects a first temperature C1 in the paper-passing region 401. Specifically, the first temperature detector 75 detects the first temperature C1 within a region of the paper-passing region of the fixing belt 71 through which a piece of paper of minimum allowable size passes. The first temperature detector 75 is disposed along the paper-passing region 401.

The second temperature detector 76 detects a second temperature C2 of the end region 403. The second temperature detector 76 is disposed along the end region 403.

When the paper 201 passes through the fixing belt 71, heat is absorbed by the paper 201 in the paper-passing region 401, so that the first temperature detector 75 does not detect an abnormal temperature rise. On the other hand, when the paper 201 passes through the fixing belt 71, heat is not absorbed by the paper 201 in the non-paper-passing region of the fixing belt 71. That is, when the paper 201 passes through the fixing belt 71, heat is not absorbed by the paper 201 in the non-paper-passing region. Thus, when the paper 201 passes through the fixing belt 71, the temperature of the non-paper-passing region becomes higher than the temperature of the paper-passing region 401 as the number of printed pieces of paper increases. As a result, as the number of pieces of paper 201 passing through the fixing belt 71 increases, an excessive temperature rise occurs in the non-paper-passing region, and the second temperature detector 76 detects an abnormal temperature rise.

Figure 5:
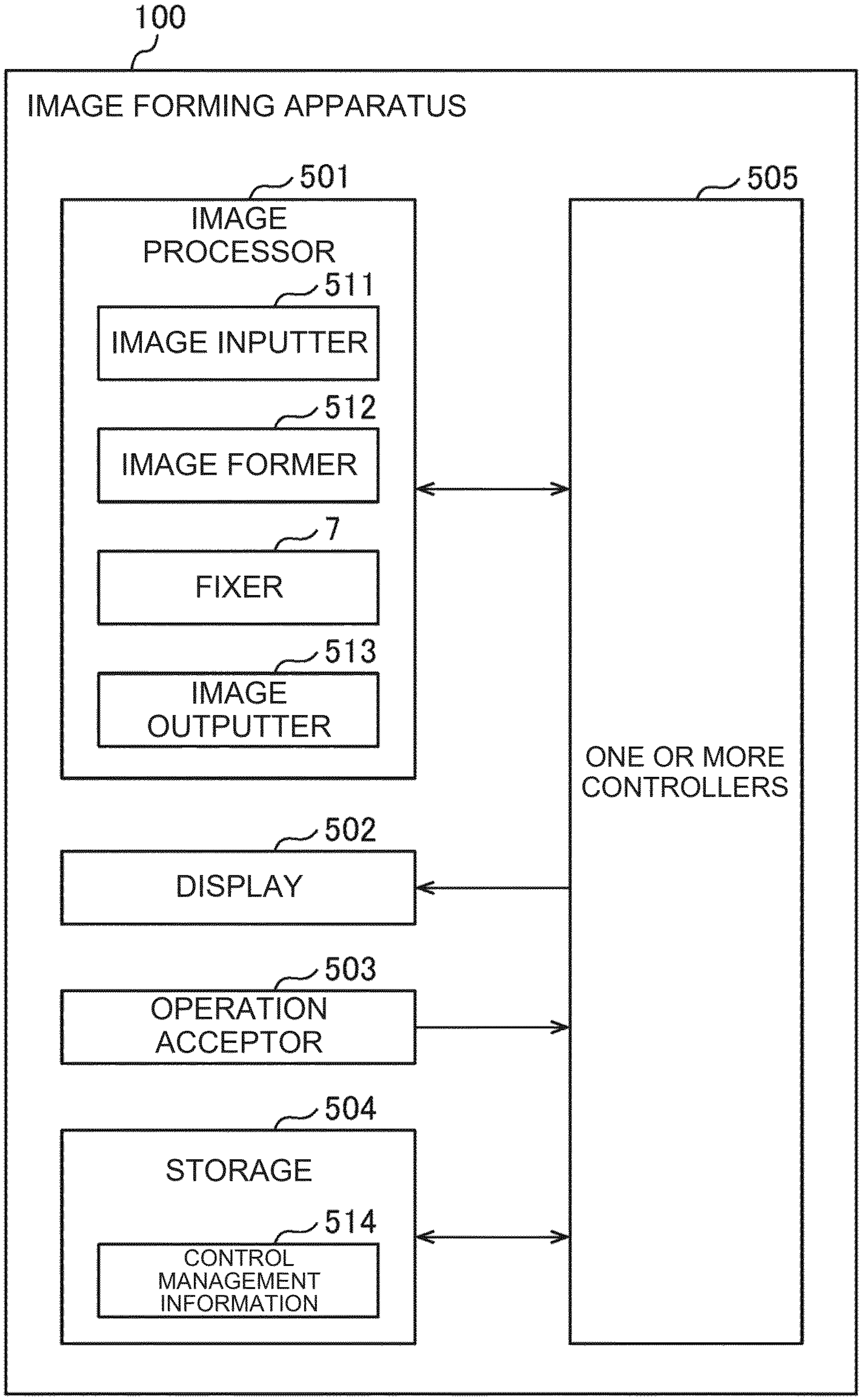
FIG. 5 is a block diagram illustrating an example of a functional configuration of the image forming apparatus.

FIG. 5 is a block diagram showing an example of a functional configuration of the image forming apparatus 100. The image forming apparatus 100 includes an image processor 501, a display 502, an operation acceptor 503, a storage 504, and one or more controllers 505.

The image processor 501 is configured by one or more image processing circuits and performs an image forming function. The image processor 501 includes an image inputter 511, an image former 512, the fixer 7, and an image outputter 513.

The image inputter 511 acquires a print job that includes a plurality of print pages. For example, the image inputter 511 acquires the print job by receiving the print job transmitted from a terminal device (not shown) connected to the image forming apparatus 100 via a network. For example, the terminal device is a personal computer (PC), a smartphone, a tablet terminal, or the like. Alternatively, the print job is a job to print image data generated from a document read by the automatic document processor 120.

The image former 512 forms an electrostatic latent image from the image data represented by each of the plurality of print pages included in the print job. The image former 512 is achieved by the developer 2, the photosensitive drum 3, the charger 5, the cleaner 4, the exposer 1, the intermediate transfer belt 61, and the like, illustrated in FIG. 1.

The image outputter 513 outputs the paper on which the electrostatic latent image is formed.

The display 502 displays information to be presented to a user. For example, the display 502 is configured by a liquid crystal panel, an organic electro-luminescence (EL) panel, or the like.

The operation acceptor 503 receives an operation from the user. For example, the operation acceptor 503 is configured by a touch panel or the like.

The operation acceptor 503 allows the user to set a fixation degree indicating the strength of fixation for fixing the color material to the plurality of pieces of paper. For example, the operation acceptor 503 allows the user to select the available fixation degree from a plurality of candidates indicated by at least one of numerical values and character strings indicating fixation for the color material.

The storage 504 is a recording medium capable of recording various data, programs, and the like. The storage 504 stores control management information 514 (see FIG. 6), the print job, and the like. The control management information 514 indicates a registered control value in association with the fixation degree, a type of paper 201, and a temperature and humidity environment. The registered control value indicates a ratio relative to a reference paper feed amount determined by the target temperature and the second temperature C2. The storage 504 is configured by a storage circuit including one or more hard disk drives (HDDs), one or more solid state drives (SSDs), one or more semiconductor memories, or the like.

The one or more controllers 505 execute various processes in accordance with the programs and data stored in the storage 504. For example, the one or more controllers 505 are configured by a control circuit including one or more processors such as a central processing unit (CPU).

The one or more controllers 505 determine a control paper feed amount, which is a paper feed amount per unit time according to the fixation degree. Specifically, the one or more controllers 505 determine the control paper feed amount according to the set fixation degree and type of paper. Alternatively, the one or more controllers 505 determine the control paper feed amount according to the set fixation degree, type of paper, and temperature and humidity environment. Then, the one or more controllers 505 pass each of the plurality of pieces of paper 201 through the fixing belt 71 in sequence at the control paper feed amount. The control paper feed amount is determined so that the first temperature C1 is a temperature at which the color material can be fixed to each of the plurality of pieces of paper 201, and the second temperature C2 is a temperature that does not exceed a control threshold temperature. Further, when the set fixation degree indicates that the fixation for the color material is to be increased above the reference fixation, the control paper feed amount is determined to be less than the reference paper feed amount, and when the fixation degree indicates that the fixation for the color material is to be decreased below the reference fixation, the control paper feed amount is determined to be more than the reference paper feed amount. The reference fixation represents a reference fixation degree for the color material based on the target temperature.

FIG. 6 is a diagram illustrating an example of the control management information 514.

The control management information 514 illustrated in FIG. 6 shows the registered control value in association with the difference from the target temperature corresponding to the fixation degree, the types of paper, namely, plain paper, thick paper, special paper, envelope, thin paper, recycled paper, glossy paper, embossed paper, and OHP, and the temperature and humidity environment, namely, NN environment, HH environment, and LL environment. The fixation degree is indicated by, for example, an amount of temperature change from the target temperature. Further, the registered control value may be, for example, a numerical value indicating a ratio relative to the reference paper feed amount. The NN environment described herein indicates an environment with normal temperature and normal humidity. The HH environment indicates an environment with high temperature or high humidity. The LL environment indicates an environment with low temperature or low humidity.

The fixation degree indicated in the control management information 514 illustrated in FIG. 6 is indicated by the amount of temperature change from the target temperature. The greater the amount of temperature change indicated by the fixation degree, the higher the temperature to which the fixing belt is heated. That is, this indicates the strong fixation of the color material to the fed paper. That is, in the control management information 514 illustrated in FIG. 6, the fixation becomes strong as the fixation degree moves to the right classifications.

In the control management information 514 illustrated in FIG. 6, the fixation degree can be changed according to the following classifications: 0 to 5° C., 6 to 10° C., 11 to 15° C., 16 to 20° C., and 21° C. or higher. However, the fixation degree shown in the control management information 514 illustrated in FIG. 6 is merely an example, and is not intended to limit the fixation degree.

For example, the control management information 514 illustrated in FIG. 6 shows the registered control value of the paper feed amount of 95% in association with the environment of normal temperature and normal humidity, the paper 201 of plain paper type, and the fixation degree indicated by the amount of temperature change of 5° C.

Further, for example, the control management information 514 illustrated in FIG. 6 shows the registered control value of the paper feed amount of 60% in association with the environment of low temperature or low humidity, the paper 201 of envelope type, and the fixation degree indicated by the amount of temperature change of 20° C.

The control management information 514 illustrated in FIG. 6 indicates that the smaller the registered control value, the smaller the paper feed amount per unit time and the wider the paper feed interval. That is, the control management information 514 illustrated in FIG. 6 indicates that the larger the amount of temperature change indicated by the fixation degree, the smaller the paper feed amount per unit time and the wider the paper feed interval. Thus, the control management information 514 illustrated in FIG. 6 indicates that the larger the amount of temperature change indicated by the fixation degree, the less frequently the pieces of paper 201 pass through, resulting in reducing heat dissipation in the paper-passing region 401 and improving the fixation for the color material.

Figure 7:
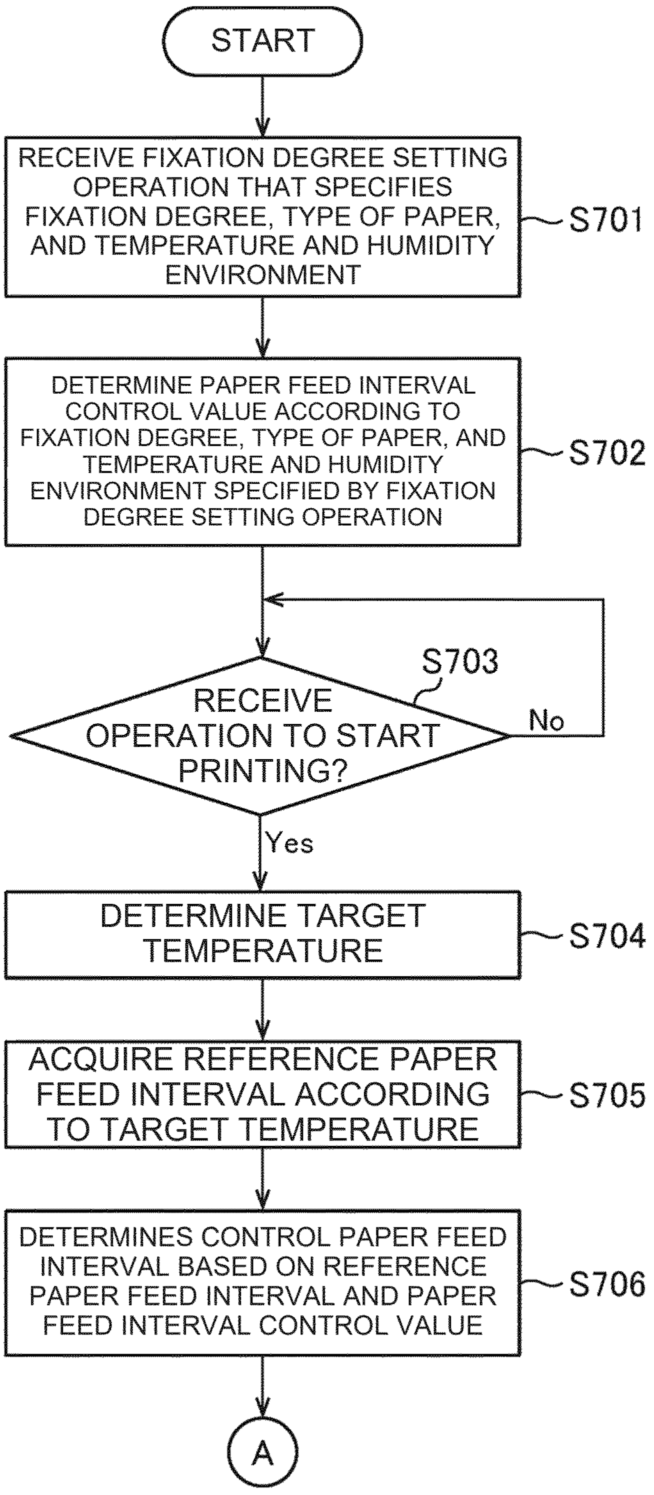
FIG. 7 is a flowchart showing an example of an operation of the image forming apparatus.
Figure 8:
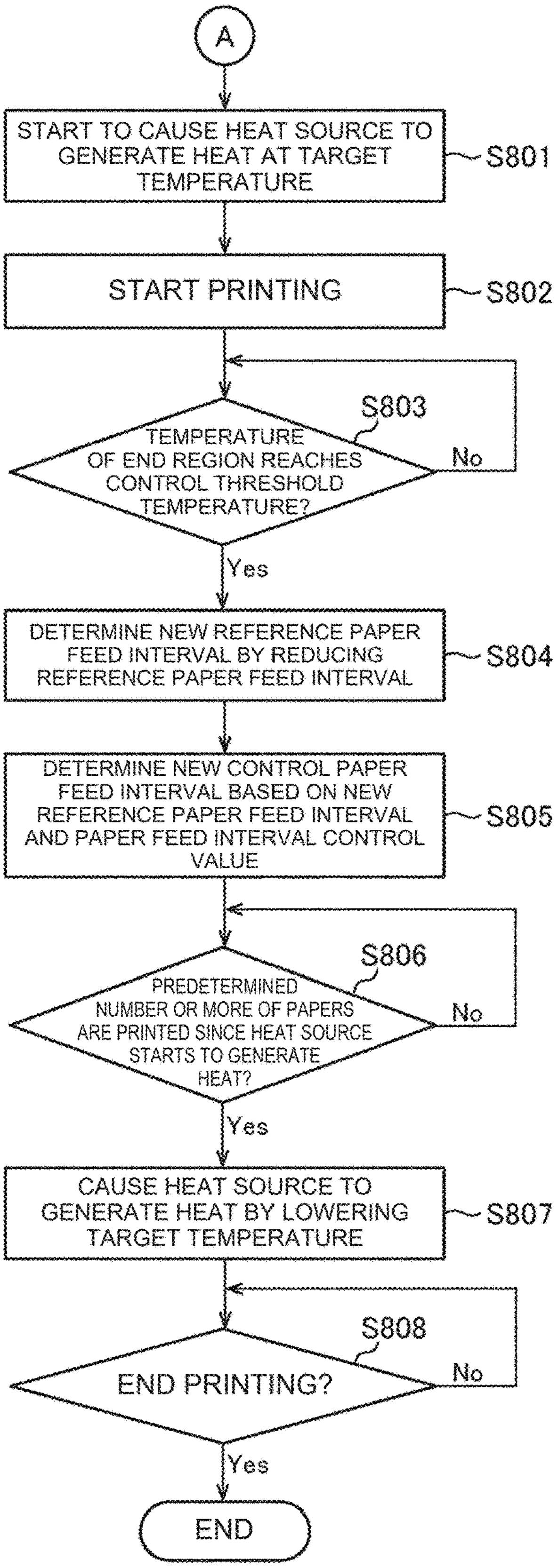
FIG. 8 is a flowchart showing an example of the operation of the image forming apparatus continued from FIG. 7.

FIG. 7 and FIG. 8 are flowcharts showing an example of the operation of the image forming apparatus 100.

When the user operates the operation acceptor 503 to specify the fixation degree and the type of paper 201, the operation acceptor 503 accepts a fixation change operation that specifies the fixation degree, the type of paper 201, and the temperature and humidity environment in a step S701.

In a step S702, the one or more controllers 505 determine a paper feed interval control value in accordance with the fixation degree, the type of paper 201, and the temperature and humidity environment, specified by a fixation degree setting operation received in the step S701. The paper feed interval control value is a ratio of the paper feed interval relative to a reference paper feed interval for feeding the paper at the reference paper feed amount. Specifically, the one or more controllers 505 acquire the registered control value in association with the fixation degree, the type of paper 201, and the temperature and humidity environment, specified by the fixation degree setting operation received in the control management information 514, and determine the paper feed interval control value from the acquired registered control value.

In a step S703, the one or more controllers 505 determine whether the operation acceptor 503 has received an operation to start printing. If the operation to start printing has not been received in the step S703, the one or more controllers

505 return the process to the step S703. On the other hand, if the operation to start printing has been received in the step S703, the one or more controllers 505 determine the target temperature in a step S704. Then, the image inputter 511 acquires the print job.

In a step S705, the one or more controllers 505 determine the reference paper feed interval for feeding the paper at the reference paper feed amount in accordance with the target temperature. The reference paper feed amount is determined by the target temperature and the second temperature C2.

In a step S706, the one or more controllers 505 determine a control paper feed interval based on the reference paper feed interval determined in the step S705 and the paper feed interval control value determined in the step S702, and then determine the control paper feed amount, which is a paper feed amount per unit time. That is, the one or more controllers 505 determine the control paper feed amount by determining the paper feed interval in accordance with the set fixation degree.

The operation of the image forming apparatus 100 is further described with reference to FIG. 8. In a step S801, the one or more controllers 505 start to cause the heat source 73 to generate heat so that the fixing belt 71 reaches the target temperature determined in the step S704 illustrated in FIG. 7. For example, if the heat source 73 is configured by a halogen heater, the one or more controllers 505 cause the heat source 73 to generate heat by turning on the halogen heater so that the fixing belt 71 reaches the target temperature. Specifically, the first temperature detector 75 detects the temperature within the paper-passing region 401, and the one or more controllers 505 cause the heat source 73 to generate heat by turning on the halogen heater so that the temperature detected by the first temperature detector 75 reaches the target temperature.

In a step S802, the one or more controllers 505 execute a process of printing the plurality of print pages included in the acquired print job onto each of the plurality of pieces of paper 201. Specifically, the one or more controllers 505 transport each of the plurality of pieces of paper 201 in sequence so that the pieces of paper 201 pass through the fixing belt 71 at the control paper feed interval determined in the step S706 illustrated in FIG. 7. Then, the one or more controllers 505 pass each of the plurality of pieces of paper 201 through the fixing belt 71 in sequence at the control paper feed amount determined in the step S706 illustrated in FIG. 7 so that the images represented by each of the plurality of print pages included in the print job are sequentially formed on each of the plurality of pieces of paper 201. Then, the one or more controllers 505 pinch the paper in the nip formed by the fixing belt 71 and the pressure roller 72, and heat-press the toner onto the paper 201, so that the fixing belt 71 mixes and pressure-bonds the multi-color toner image transferred onto the paper 201, thereby thermally fixing the multi-color toner image to each of the plurality of pieces of paper 201 in sequence. Then, the image outputter 513 sequentially outputs each of the plurality of pieces of paper 201 onto which the multi-color toner image is thermally fixed.

In a step S803, the one or more controllers 505 determine whether the temperature of the end region 403 detected by the second temperature detector 76 has reached the control threshold temperature. If the temperature of the end region 403 has not reached the control threshold temperature in the step S803, the one or more controllers 505 return the process to the step S803, transport the pieces of paper 201 so that the pieces of paper 201 pass through the fixing belt 71 at the control paper feed interval, and continue the process of printing each of the plurality of print pages included in the print job in sequence.

On the other hand, if it is determined in the step S803 that the temperature of the end region 403 has reached the control threshold temperature, in a step S804, the one or more controllers 505 determine the new reference paper feed interval that is lower than the reference paper feed interval determined in the step S705 illustrated in FIG. 7, and then determine the new reference paper feed amount that is less than the reference paper feed amount determined in the step S705. The new reference paper feed amount is determined by the target temperature set in a step S807 described below and the second temperature C2.

In a step S805, the one or more controllers 505 determine the new control paper feed interval based on the new reference paper feed interval determined in a step S804 and the paper feed interval control value determined in the step S702 illustrated in FIG. 7, and then determine the new control paper feed amount. That is, the one or more controllers 505 determine the new control paper feed amount by determining the new paper feed interval according to the fixation degree.

Since the new control paper feed amount is smaller than the control paper feed amount determined in the step S706 illustrated in FIG. 7, the new control paper feed interval is wider than the control paper feed interval determined in the step S706 illustrated in FIG. 7. Thus, the one or more controllers 505 widen the paper feed interval compared to the paper feed interval before the temperature of the end region 403 reaches the control threshold temperature. As a result, in the paper-passing region 401, the heat required for the next paper 201 is prevented from being dissipated from the fixing belt 71, and the heat is more likely to be stored in the fixing belt 71. As a result, the image forming apparatus 100 can reduce the number of times the heat source 73 generates heat for supplying the heat to the paper-passing region 401. This allows the image forming apparatus 100 to prevent the temperature in the non-paper-passing regions from rising excessively and ensure safety.

In a step S806, the one or more controllers 505 determine whether a predetermined number or more of the pieces of paper 201 have been printed since the heat source 73 starts to generate heat at the target temperature in the step S801. In the step S806, if the predetermined number or more of the pieces of paper 201 have not been printed since the heat source 73 starts to generate heat, the one or more controllers 505 return the process to the step S806. Then, the one or more controllers 505 continue the process of sequentially printing each of the plurality of print pages included in the print job by transporting the pieces of paper 201 so that the pieces of paper 201 pass through the fixing belt 71 at the new control paper feed interval determined in the step S805.

On the other hand, if the predetermined number or more of the pieces of paper 201 have been printed in the step S806, the one or more controllers 505 cause the heat source 73 to generate heat by lowering the target temperature in the step S807.

In a step S808, the one or more controllers 505 determine whether to end printing. If all the print pages included in the print job have not been printed, the one or more controllers 505 determine not to end the printing. On the other hand, if all the print pages included in the print job have been printed, the one or more controllers 505 determine to end the printing.

If it is determined not to end the printing in the step S808, the one or more controllers 505 return the process to the step S808, and transport the pieces of paper 201 so that the pieces of paper 201 pass through the fixing belt 71 at the new control paper feed interval determined in the step S805, thereby continuing the process of printing each of the plurality of print pages included in the print job in sequence. On the other hand, if it is determined to end the printing in the step S808, the one or more controllers 505 stop the heat source 73 from generating heat, and stop the process of printing.

Figure 9:
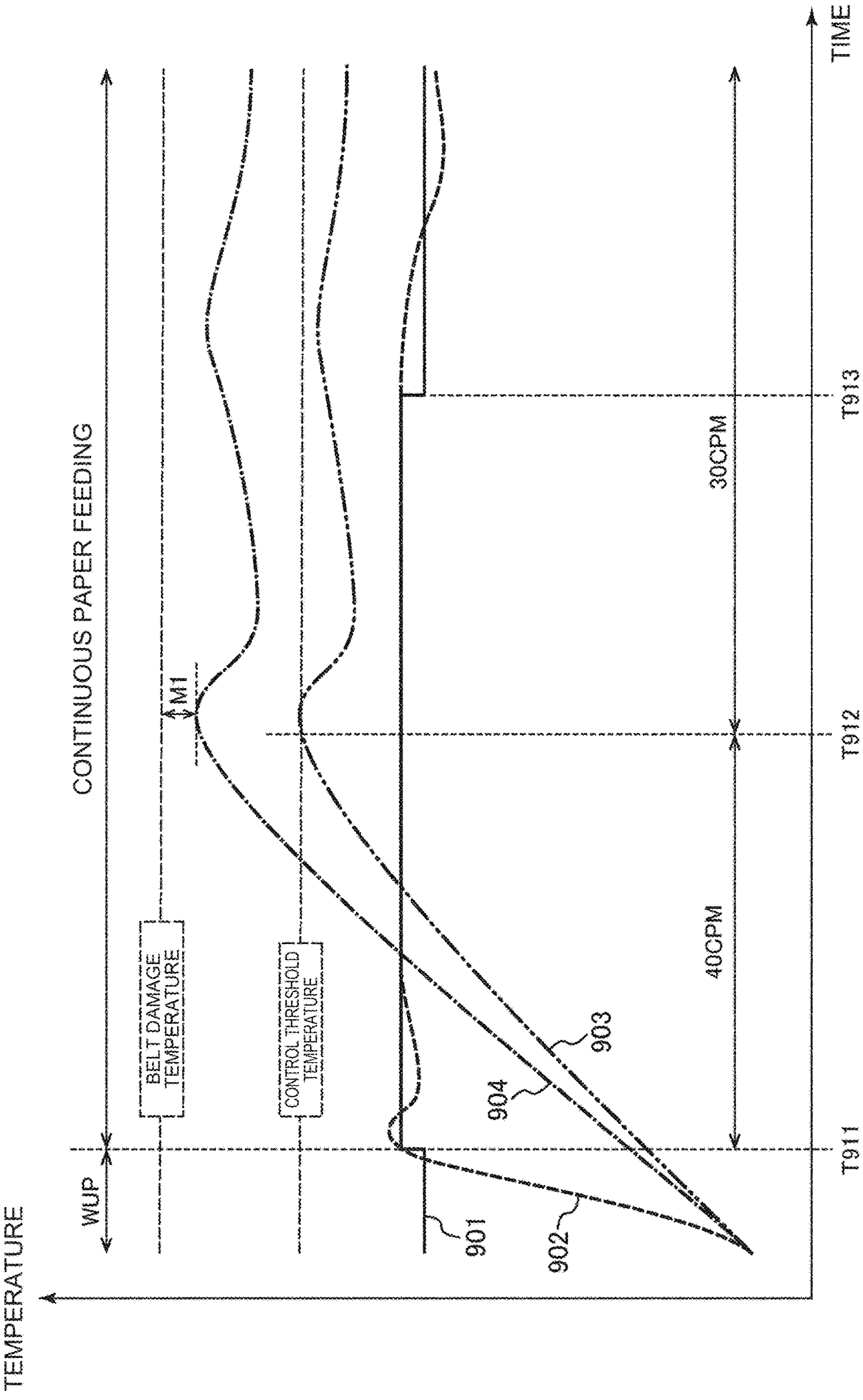
FIG. 9 is a graph showing an example of temperature transition when pieces of paper pass through a fixing belt at a reference paper feed amount.

FIG. 9 is a graph showing an example of the temperature transition when the pieces of paper 201 pass through the fixing belt 71 at the reference paper feed amount for all the printing pages included in the print job. In FIG. 9, the horizontal axis represents the time and the vertical axis represents the temperature. Specifically, FIG. 9 shows a target temperature 901, a temperature 902 of the paper-passing region 401 detected by the first temperature detector 75, a temperature 903 of the end region 403 detected by the second temperature detector 76, and a temperature 904 of the region 404. The temperature 904 of the region 404 is represented by an estimated value calculated from the temperature 903 of the end region 403.

At a time T911, the one or more controllers 505 start to cause the heat source 73 to generate heat so that the fixing belt 71 reaches the target temperature 901. Then, the one or more controllers 505 transport each of the plurality of pieces of paper 201 in sequence so that each of the plurality of pieces of paper 201 passes through the fixing belt 71 at a paper feed amount of 40 CPM (Count Per Minute).

In the end regions 403, heat is dissipated in the axial direction of the fixing belt 71 and in the passing direction of the paper 201, which is perpendicular to the axial direction of the fixing belt 71. On the other hand, in the regions 404, heat is dissipated in the fixing direction of the paper 201, which is perpendicular to the axial direction of the fixing belt 71, and heat is not dissipated in the axial direction of the fixing belt 71. Thus, as illustrated in FIG. 9, the temperature 904 of the region 404 is higher than the temperature 903 of the end region 403. Thus, for preventing the fixing belt 71 from being damaged due to an increase in the temperature 904 of the regions 404, as illustrated in FIG. 9, the temperature 904 of the regions 404 is required to have a margin M1 to a belt damage temperature at which the fixing belt 71 is damaged.

At a time T912, when the temperature 903 reaches the control threshold temperature, the one or more controllers 505 transport the pieces of paper 201 so that the pieces of paper 201 pass through the fixing belt 71 at the new paper feed amount of 30 CPM. By reducing the paper feed amount per unit time and widening the paper feed interval, in the paper-passing region 401, the heat required for the next paper 201 is prevented from being dissipated from the fixing belt 71, and the heat is more likely to be stored in the fixing belt 71. As a result, the image forming apparatus 100 can reduce the number of times the heat source 73 generates heat for supplying the heat to the paper-passing region 401. This allows the image forming apparatus 100 to prevent the temperature 903 of the end region 403 and the temperature 904 of the region 404 from rising excessively.

After the time T912, the paper feed interval widens, causing the temperature 903 of the end region 403 and the temperature 904 of the region 404 to temporarily decrease. However, since heat is generated by the heat source 73 to supply the necessary heat to the paper-passing region 401, the temperature 903 of the end region 403 and the temperature 904 of the region 404 rise again.

Thus, at a time T913, when a predetermined number or more of the pieces of paper 201 have been printed since the heat source 73 starts to generate heat at the target temperature 901, the one or more controllers 505 lower the target temperature 901. In this manner, the image forming apparatus 100 can prevent an increase in the temperature 903 of the end region 403 and the temperature 904 of the region 404, which are the temperatures of the non-paper-passing regions.

Figure 10:
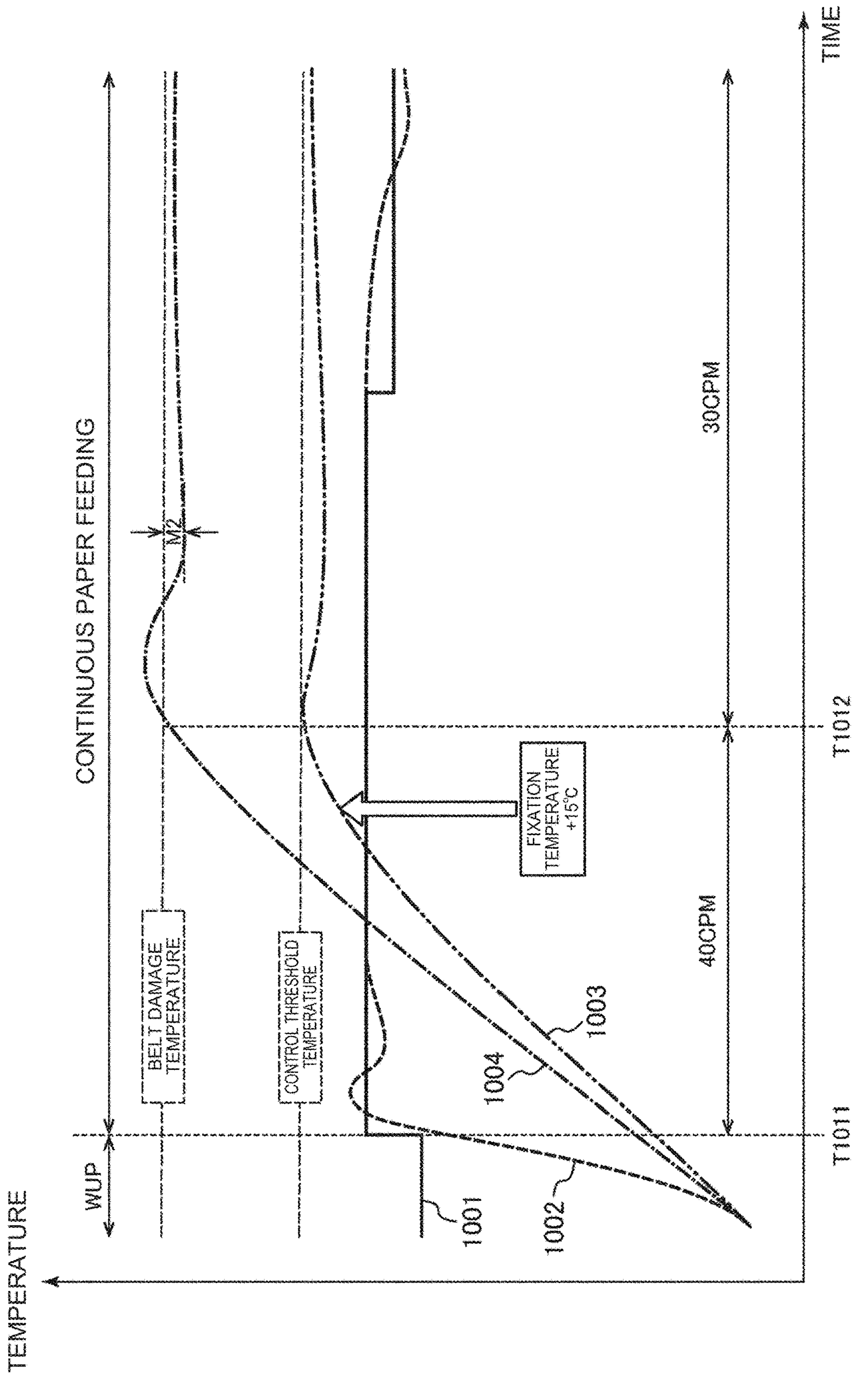
FIG. 10 is a diagram illustrating an example of the temperature transition when the target temperature is increased above the target temperature illustrated in FIG. 9, and the pieces of paper pass through the fixing belt at the reference paper feed amount.

FIG. 10 is a diagram showing an example of the temperature transition when a target temperature 1001 is increased by 15° C. from the target temperature 901 illustrated in FIG. 9, and the pieces of paper 201 are passed through the fixing belt 71 at the reference paper feed amount for all the print pages included in the print job. In FIG. 10, the horizontal axis represents the time and the vertical axis represents the temperature. Specifically, FIG. 10 shows the target temperature 1001, a temperature 1002 of the paper-passing region 401 detected by the first temperature detector 75, a temperature 1003 of the end region 403 detected by the second temperature detector 76, and a temperature 1004 of the region 404. The temperature 1004 of the region 404 is represented by an estimated value calculated from the temperature 1003 of the end region 403.

At a time T1011, the one or more controllers 505 start to cause the heat source 73 to generate heat so that the fixing belt 71 reaches the target temperature 1001. Then, the one or more controllers 505 sequentially transport each of the plurality of pieces of paper 201 so that each of the plurality of pieces of paper 201 passes through the fixing belt 71 at a paper feed amount of 40 CPM.

As illustrated in FIG. 10, when the target temperature 1001 is 15° C. higher than the target temperature 901, at a time T1012, the temperature 1003 of the end region 403 may exceed the control threshold temperature. In such a case, there is a risk that the temperature 1004 of the region 404 may exceed the belt damage temperature. That is, when the temperature 1002 of the paper-passing region 401 is increased by increasing the target temperature 1001 for achieving the fixation of the color material, there is a risk that the temperature 904 of the region 404 may exceed the belt damage temperature.

Thus, after the time T1012, the one or more controllers 505 transport the pieces of paper 201 so that the pieces of paper 201 pass through the fixing belt 71 at a new paper feed amount of 30 CPM. However, because the target temperature 1001 is 15° C. higher than the target temperature 901, the temperature 1003 of the end region 403 decreases more slowly than the temperature 903 illustrated in FIG. 9. Similarly, because the target temperature 1001 is 15° C. higher than the target temperature 901, the temperature 1004 of the region 404 decreases more slowly than the temperature 904 illustrated in FIG. 9. As a result, because the target temperature 1001 is 15° C. higher than the target temperature 901, a margin M2 to the belt damage temperature is smaller than the margin M1 illustrated in FIG. 9, causing a risk that the margin M2 to the belt damage temperature cannot be sufficiently obtained.

Figure 11:
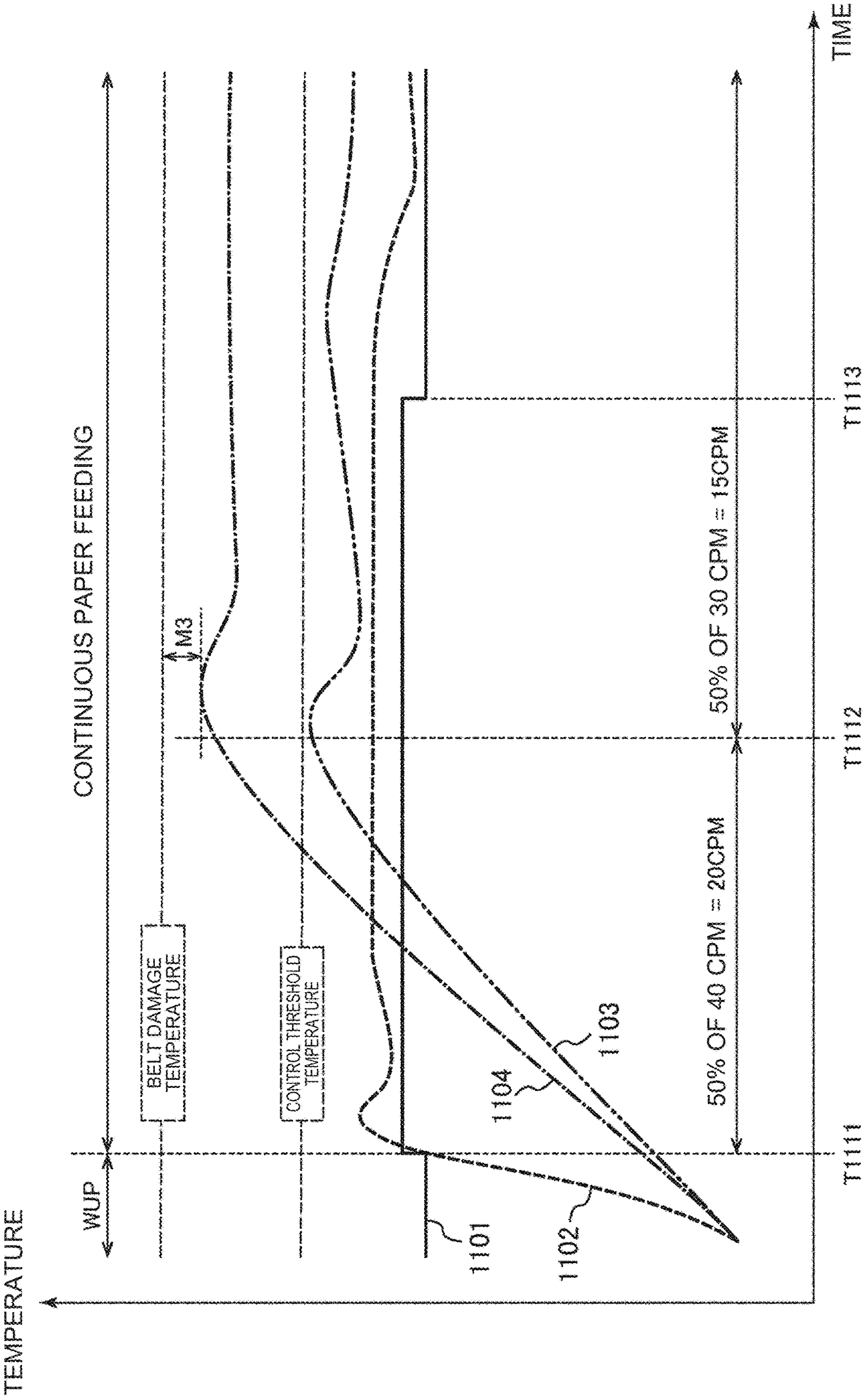
FIG. 11 is a graph showing an example of the temperature transition when the pieces of paper pass through the fixing belt at a control paper feed amount.

FIG. 11 is a graph showing an example of the temperature transition when the pieces of paper 201 pass through the fixing belt 71 at the control paper feed amount for all the print pages included in the print job. In FIG. 11, the horizontal axis represents the time and the vertical axis represents the temperature. Specifically, FIG. 11 shows a target temperature 1101, a temperature 1102 of the paper-passing region 401 detected by the first temperature detector 75, a temperature 1103 of the end region 403 detected by the second temperature detector 76, and a temperature 1104 of the region 404. The temperature 1104 of the region 404 is represented by an estimated value calculated from the transition of the temperature 1103 of the end region 403.

In the present example, the one or more controllers 505 acquire the registered control value of 50% in the step S702 illustrated in FIG. 7. Further, in the present example, the one or more controllers 505 determine the reference paper feed amount to be 40 CPM in the step S705 illustrated in FIG. 7. In this case, the one or more controllers 505 determine the control paper feed amount to be 20 CPM (=40 CPM×0.5) in the step S706 illustrated in FIG. 7. The reference paper feed amount is determined by the target temperature. For example, if the registered control value acquired in the step S702 is indicated by a ratio relative to the reference paper feed amount, the control paper feed amount is determined by the ratio indicated by the registered control value relative to the reference paper feed amount.

At a time T1111, the one or more controllers 505 start to cause the heat source 73 to generate heat so that the fixing belt 71 reaches the target temperature 1101. Then, the one or more controllers 505 transport the pieces of paper 201 so that the pieces of paper 201 pass through the fixing belt 71 at the control paper feed amount of 20 CPM.

The one or more controllers 505 feed the pieces of paper 201 at the control paper feed amount of 20 CPM, which prevents the heat required for the next paper 201 from being dissipated from the fixing belt 71 in the paper-passing region 401 and facilitates the accumulation of heat in the fixing belt 71. As a result, as illustrated in FIG. 11, the temperature 1102 of the paper-passing region 401 becomes higher than the temperature 902 illustrated in FIG. 9 without the one or more controllers 505 increasing the target temperature 1101.

At a time T1112, when the temperature 1103 reaches the control threshold temperature, the one or more controllers 505 determine the new reference paper feed amount to be 30 CPM in the step S804 illustrated in FIG. 8. Then, in the step S805 illustrated in FIG. 8, the one or more controllers 505 determine the new control paper feed amount to be 15 CPM (=30 CPM×0.5). For example, if the registered control value acquired in the step S702 is indicated by a ratio relative to the reference paper feed amount, the new control paper feed amount is determined by the ratio indicated by the registered control value relative to the new reference paper feed amount.

The one or more controllers 505 sequentially transport each of the plurality of pieces of paper 201 so that each of the plurality of pieces of paper 201 passes through the fixing belt 71 at the new control paper feed amount of 15 CPM. By widening the paper feed interval, the one or more controllers 505 prevent the heat required for the next paper 201 from being dissipated from the fixing belt 71 in the paper-passing region 401 without increasing the target temperature, and facilitate the accumulation of heat in the fixing belt 71. As a result, the image forming apparatus 100 can improve the fixation in the paper-passing region 401 of the fixing belt 71 without excessively heating the fixing belt 71. Further, the one or more controllers 505 not increasing the target temperature can prevent the non-paper-passing regions of the fixing belt 71 from being excessively heated. As a result, the image forming apparatus 100 can achieve the fixation of the color material without excessively heating the fixing belt 71 and obtain a margin M3 to the belt damage temperature for the temperature 1104 of the region 404. Thus, the image forming apparatus 100 can achieve the fixation of the color material while ensuring safety.

At a time T1113, if the predetermined number or more of the pieces of paper 201 have been printed since the heat source 73 starts to generate heat at the target temperature 901 in the step S801 illustrated in FIG. 8, the one or more controllers 505 cause the heat source 73 to generate heat by lowering the target temperature 1101 in the step S807 illustrated in FIG. 8. As a result, the image forming apparatus 100 can prevent an increase in the temperature 1103 of the end region 403 and the temperature 1104 of the region 404, which are the temperatures of the non-paper-passing regions.

FIG. 12 to FIG. 15 are diagrams illustrating an example of the display 502 and the operation acceptor 503, which are configured by a touch panel display.

Figure 12:
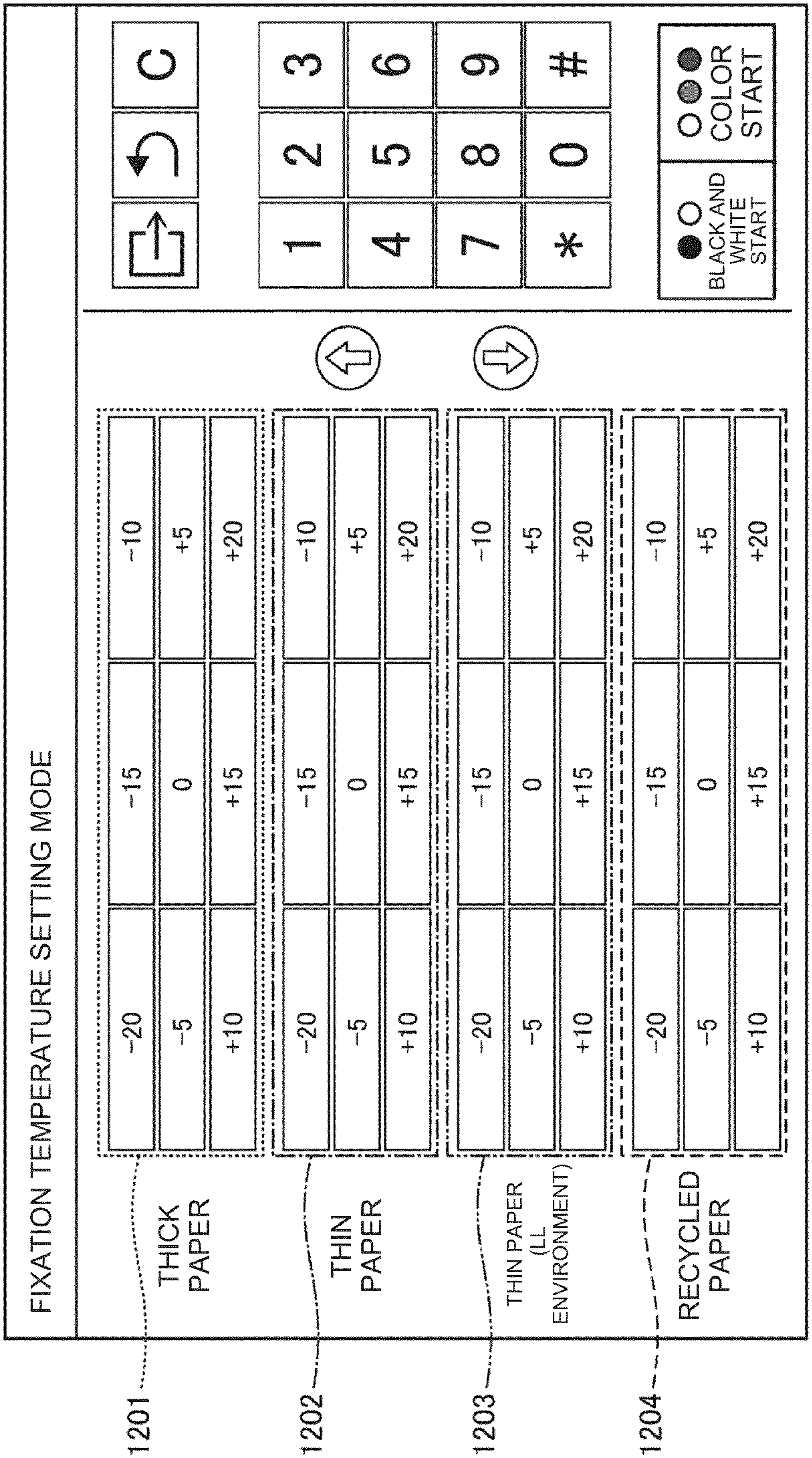
FIG. 12 is a diagram illustrating an example of keys indicating a fixation degree for types of paper, namely, thick paper, thin paper, and recycled paper.

FIG. 12 is a diagram illustrating an example of keys indicating the fixation degree for the types of paper 201, namely, thick paper, thin paper, and recycled paper. A region 1201, a region 1202, and a region 1204 illustrated in FIG. 12 show the fixation degree indicated by the amount of temperature change from the target temperature for the types of paper 201, namely, thick paper, thin paper, and recycled paper, respectively, in a normal temperature and normal humidity environment. A region 1203 illustrated in FIG. 12 shows the fixation degree indicated by the amount of temperature change from the target temperature for the type of paper 201, namely, thin paper, in a low temperature or low humidity environment.

Figure 13:
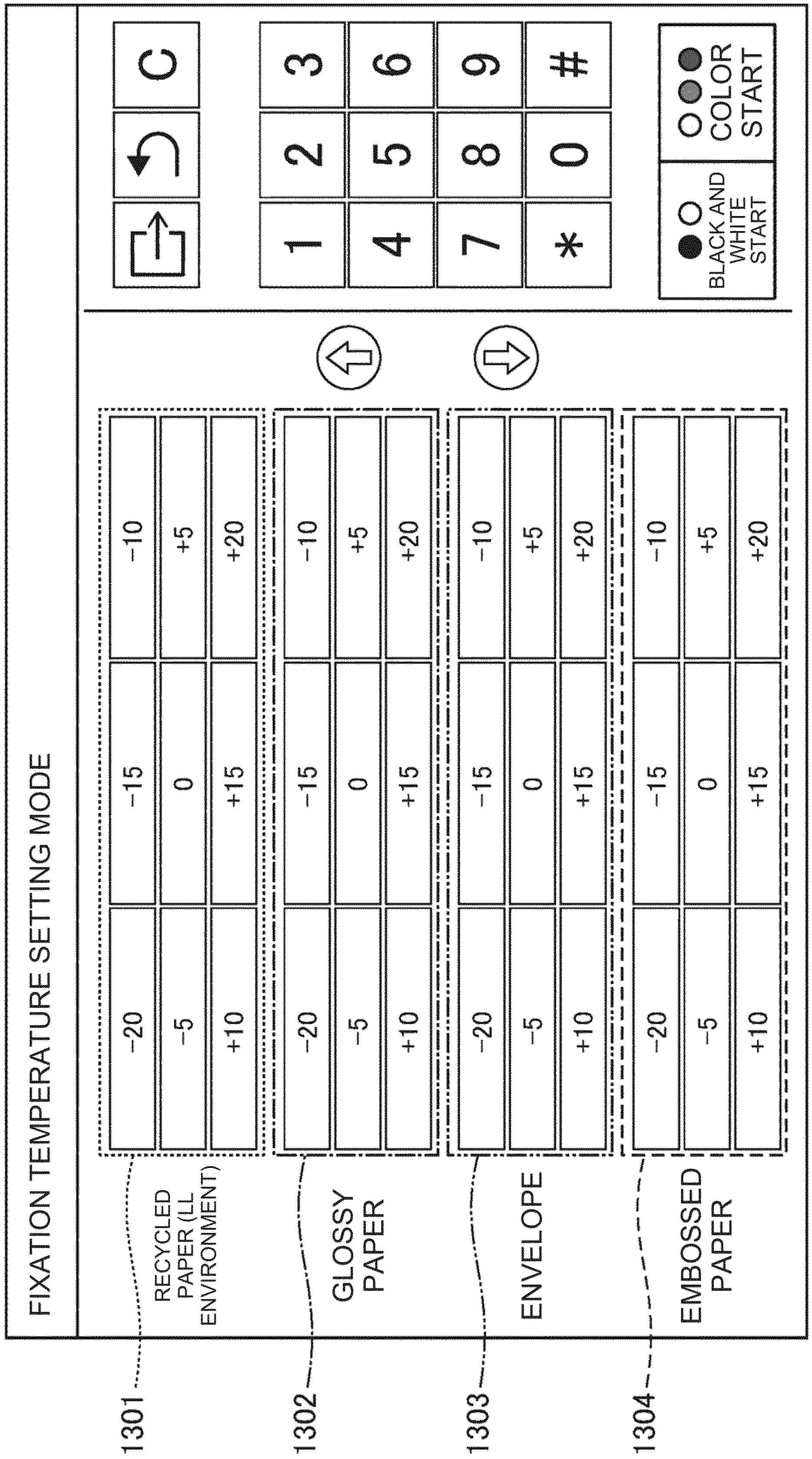
FIG. 13 is a diagram illustrating an example of the keys indicating the fixation degree for the types of paper, namely, recycled paper, glossy paper, envelope, and embossed paper.

FIG. 13 is a diagram illustrating an example of the keys indicating the fixation degree for the types of paper 201, namely, recycled paper, glossy paper, envelope, and embossed paper. A region 1301 illustrated in FIG. 13 shows the fixation degree indicated by the amount of temperature change from the target temperature for the type of paper 201, namely, recycled paper, in a low temperature or low humidity environment. Regions 1302 to 1304 illustrated in FIG. 13 show the fixation degree indicated by the amount of temperature change from the target temperature for the types of paper 201, namely, glossy paper, envelope, and embossed paper, respectively, in a normal temperature and normal humidity environment.

Figure 14:
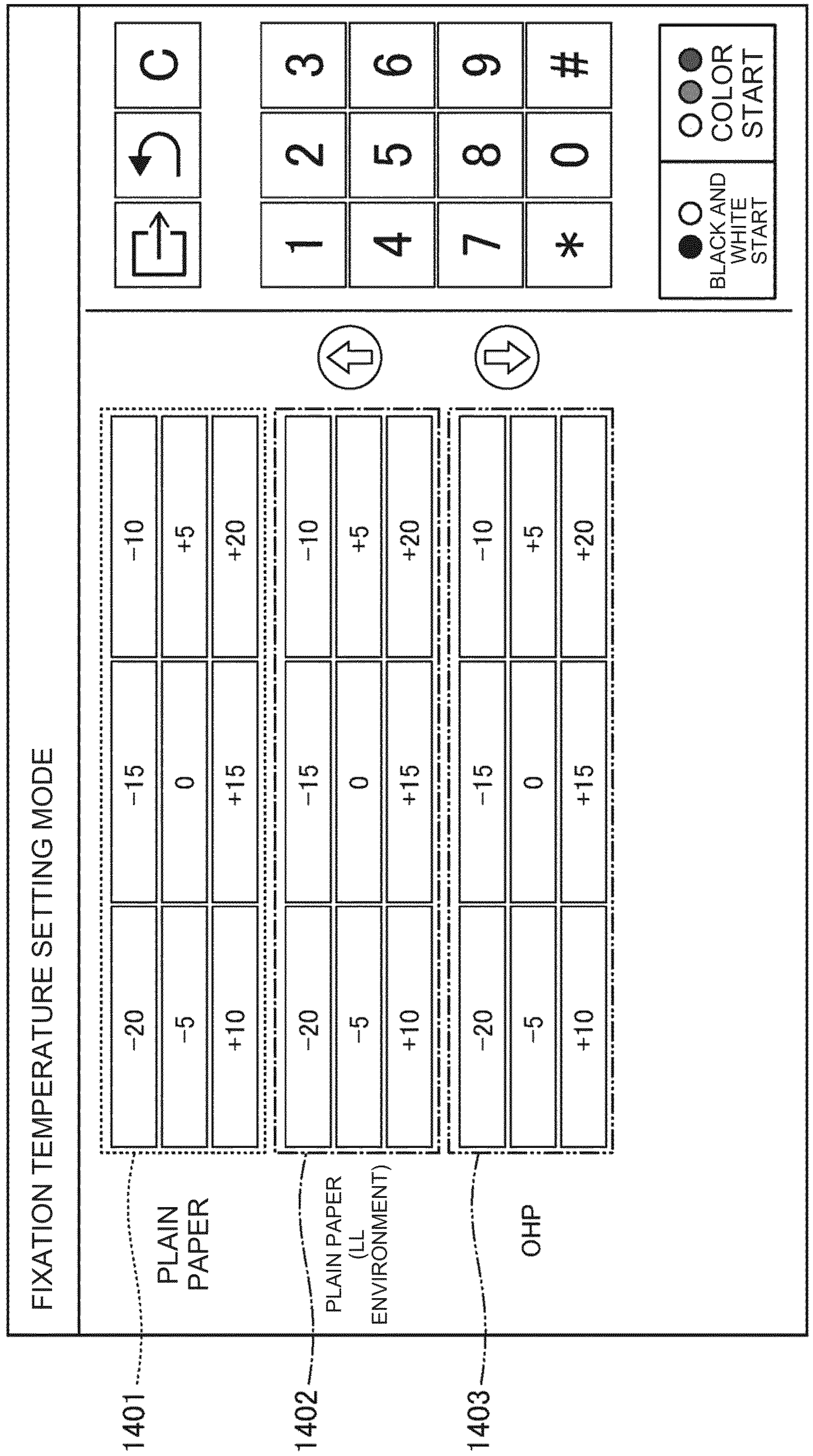
FIG. 14 is a diagram illustrating an example of the keys indicating the fixation degree for the types of paper, namely, plain paper and OHP.

FIG. 14 is a diagram illustrating an example of the keys indicating the fixation degree for the types of paper 201, namely, plain paper and OHP. A region 1401 and a region 1403 illustrated in FIG. 14 show the fixation degree indicated by the amount of temperature change from the target temperature for the types of paper 201, namely, plain paper and OHP, respectively, in a normal temperature and normal humidity environment. A region 1402 illustrated in FIG. 14 shows the fixation degree indicated by the amount of temperature change from the target temperature for the type of paper 201, namely, plain paper, in a low temperature or low humidity environment.

The regions 1201 to 1204 illustrated in FIG. 12, the regions 1301 to 1304 illustrated in FIG. 13, and the regions 1401 to 1403 illustrated in FIG. 14 include the keys indicating the amount of temperature change from the target temperature as follows: −20° C., −15° C., −10° C., 0° C., +5° C., +10° C., +15° C., and +20° C. The larger the amount of temperature change from the target temperature in the positive direction, the higher the fixation of the color material. On the other hand, the larger the amount of temperature change from the target temperature in the negative direction, the lower the fixation of the color material.

For example, when performing an operation of printing on the paper 201 of the plain paper type in a low temperature or low humidity environment, a user performs a fixation change operation to specify the fixation degree indicated by the amount of temperature change from the target temperature. In this case, the user performs the fixation change operation to specify the fixation degree indicated by the amount of temperature change from the target temperature in the region 1402 on the operation acceptor 503. As a result, in the step S701 illustrated in FIG. 7, the operation acceptor 503 receives the fixation change operation that specifies the fixation degree indicated by the amount of temperature change selected in the region 1402, the type of paper 201 being plain paper, and the temperature and humidity environment being a low temperature or low humidity environment. Then, in the step S702 illustrated in FIG. 7, the one or more controllers 505 acquire, from the control management information 514, the registered control value in association with the fixation degree selected in the region 1402, the type of paper 201 being plain paper, and the temperature and humidity environment being a low temperature or low humidity environment.

Figure 15:
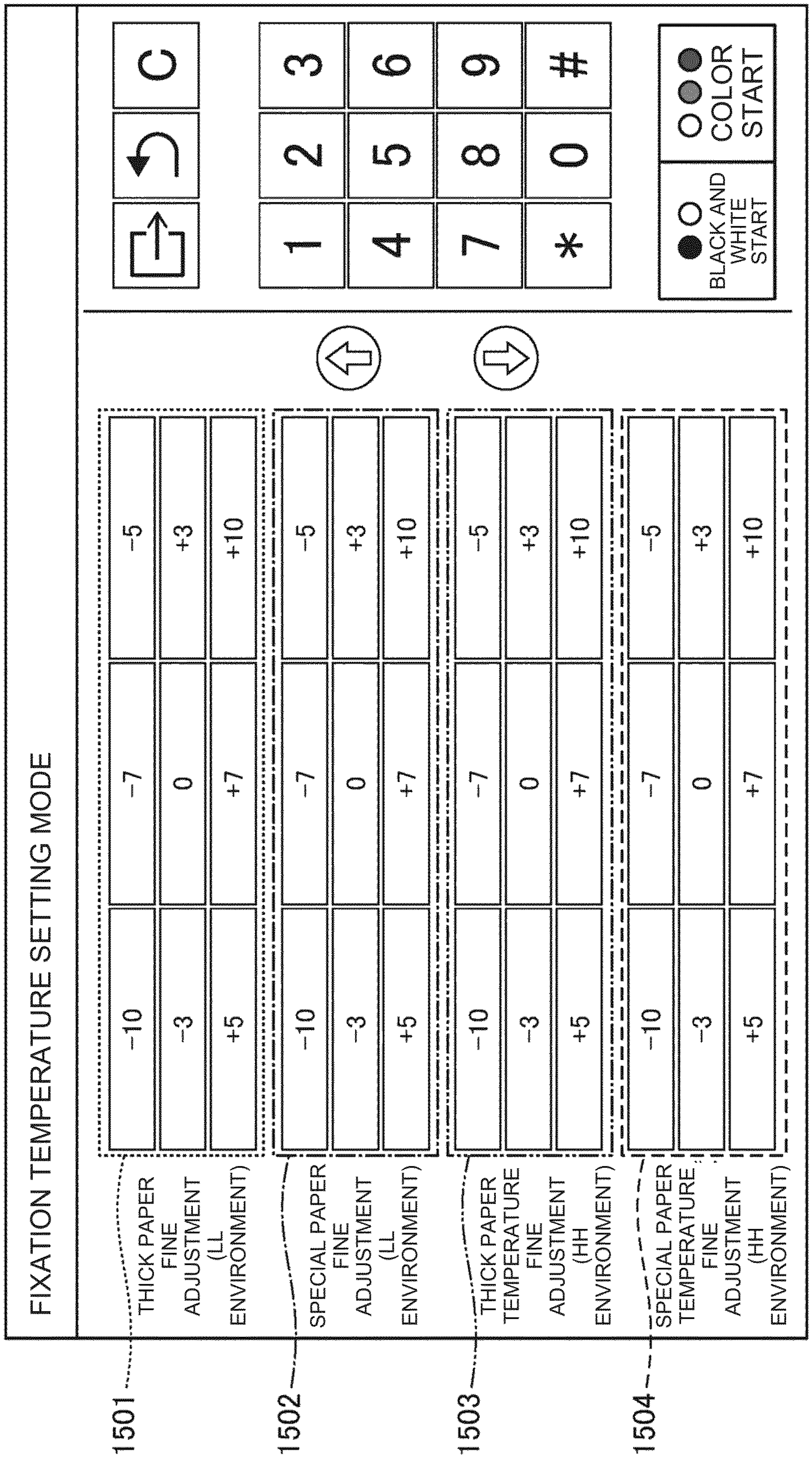
FIG. 15 is a diagram illustrating an example of the keys indicating the fixation degree for the types of paper, namely, thick paper and special paper.

FIG. 15 is a diagram illustrating an example of the keys indicating the fixation degree for the types of paper 201, namely, thick paper and special paper. Regions 1501 and 1502 illustrated in FIG. 15 show the fixation degree indicated by the amount of temperature change smaller than that illustrated in FIG. 12 to FIG. 14 for the types of paper 201, namely, thick paper and special paper, respectively, in a low temperature or low humidity environment. Regions 1503 and 1504 illustrated in FIG. 15 show the fixation degree indicated by the amount of temperature change smaller than that illustrated in FIG. 12 to FIG. 14 for the types of paper 201, namely, thick paper and special paper, respectively, in a high temperature or high humidity environment. The regions 1501 to 1504 illustrated in FIG. 15 include the keys indicating the amount of temperature change from the target temperature as follows: −10° C., −7° C., −5° C., −3° C., 0° C., +3° C., +5° C., +7° C., and +10° C.

As illustrated in FIG. 12 to FIG. 15, the image forming apparatus 100 allows the user to specify the type of paper 201, the temperature and humidity environment, and the fixation degree. Then, the image forming apparatus 100 determines the control paper feed amount according to the specified fixation degree, the specified type of paper 201, and the temperature and humidity environment.

Note that, when the operation acceptor 503 receives the fixation change operation that specifies the fixation degree indicated by the amount of temperature change of 0° C., the one or more controllers 505 determine the control paper feed amount to be the reference paper feed amount.

As described above, when the image forming apparatus 100 receives, from the user, the fixation change operation that specifies the amount of temperature change from the target temperature, the image forming apparatus 100 achieves the fixation of the color material by changing the paper feed amount per unit time without changing the target temperature. In this manner, when small size pieces of paper are continuously passed through the fixing belt 71, the image forming apparatus 100 can achieve the fixation of the color material without changing the fixation temperature, while reducing the temperature rise in the non-paper-passing regions, maintaining the margin to the belt damage temperature, and ensuring safety.

Modification

As a modification of the image forming apparatus 100, the fixation degree may be indicated by at least one of numerical values and character strings indicating the fixation for the color material. For example, the character strings indicating the fixation for the color material may be "weak", "medium", or "strong", "−1", "0", or "+1", or the like.

FIG. 16 is a diagram illustrating an example of the control management information 514 according to the present modification. The control management information 514 illustrated in FIG. 16 shows the registered control value in association with the fixation degree.

The fixation degree indicated in the control management information 514 illustrated in FIG. 16 is represented by numerical values from 1 to 5 indicating the strength of fixation for the color material. The larger the numerical value indicated by the fixation degree, the stronger the fixation for the color material. Further, the registered control value shown in the control management information 514 illustrated in FIG. 16 indicates a ratio relative to the reference paper feed amount. The larger the registered control value shown in the control management information 514 illustrated in FIG. 16, the smaller the paper feed amount per unit time and the wider the paper feed interval. Thus, in the control management information 514 illustrated in FIG. 17, the larger the numerical value indicated by the fixation degree, the lower the frequency with which the pieces of paper 201 pass through the paper-passing region 401, resulting in reducing heat dissipation in the paper-passing region 401.

Figure 17:
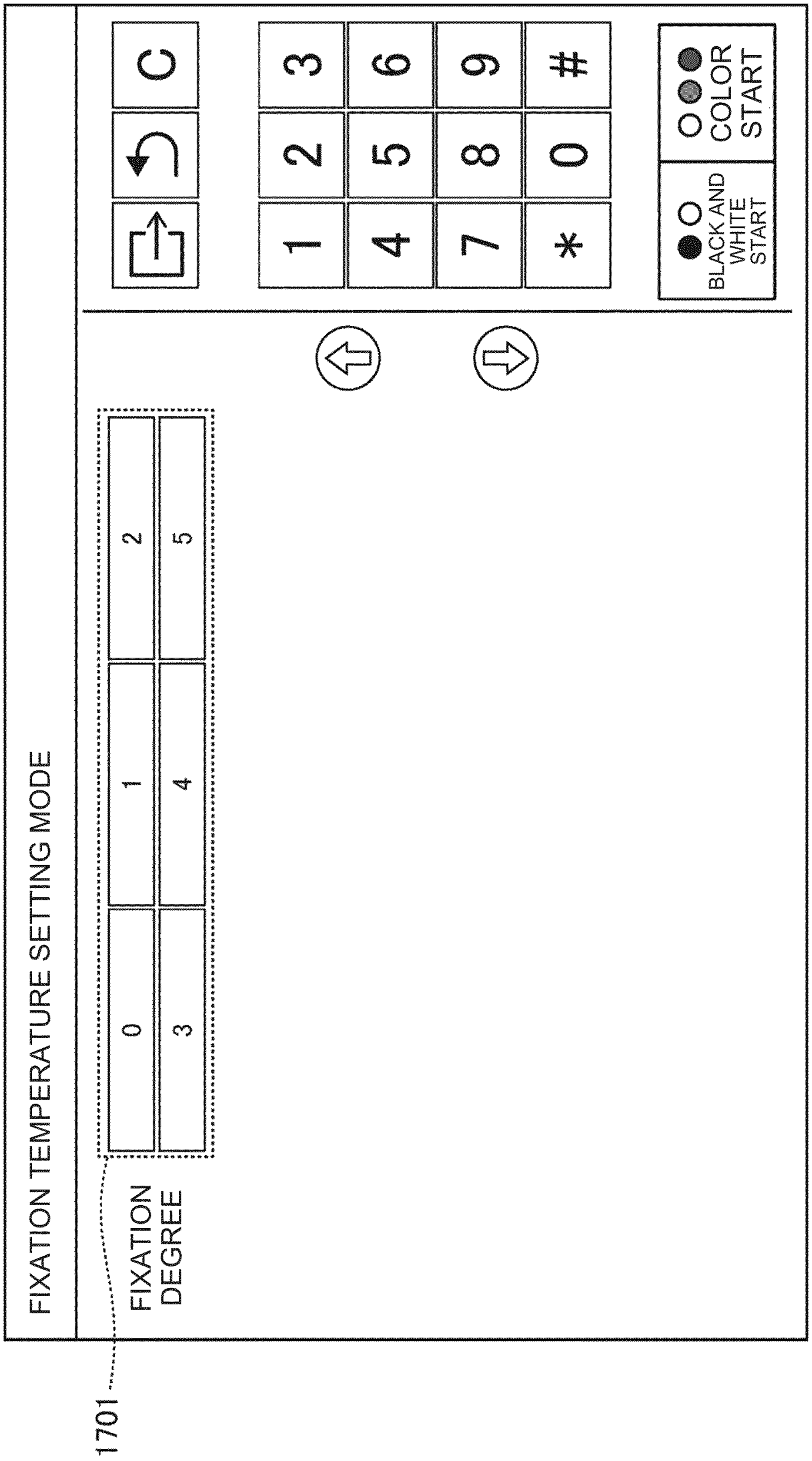
FIG. 17 is a diagram illustrating an example of the keys indicating the fixation degree that indicates the strength of the fixation for a color material.

FIG. 17 is a diagram illustrating an example of the keys indicating the fixation degree, which indicates the strength of fixation for the color material. A region 1701 illustrated in FIG. 17 includes the keys indicating the fixation degree ranging from 0 to 5. The fixation degree of 0 indicates that the pieces of paper 201 pass through the fixing belt 71 at the reference paper feed interval. When the user performs an operation on the operation acceptor 503 to select one of the keys indicating 0 to 5 in the region 1701, in the step S701 illustrated in FIG. 7, the operation acceptor 503 receives the fixation change operation that specifies the fixation degree indicated by the key selected in the region 1701. Then, the one or more controllers 505 execute the processes of the steps S704 to S706 to determine the control paper feed amount according to the fixation degree indicated by the key selected in the region 1701 on the control management information 514 illustrated in FIG. 16.

As described above, the image forming apparatus 100 according to the present modification shows the fixation degree with the numerical values or the character strings different from the amount of temperature change, thereby allowing the user to easily select the fixation degree even when the user is not aware of the relationship between the fixing temperature and the fixation.

Each process executed in the above-mentioned embodiments are not limited to the mode of process exemplified in the embodiments. The above-mentioned functional blocks may be achieved by using either a logic circuit (hardware) formed in an integrated circuit or the like, or software using a CPU. Each process executed in the above-mentioned embodiments may be executed by multiple computers. For example, some of the processes executed by the image forming apparatus 100 may be executed by another computer, or all the processes may be shared and executed by multiple computers.

The present disclosure is not limited to the above-mentioned embodiments, and may be replaced with a configuration that is substantially the same as the configuration shown in the above-mentioned embodiments, a configuration that has the same working effects, or a configuration that can achieve the same purpose. The technical scope of the present disclosure also includes embodiments obtained by appropriately combining the technical means disclosed in the different embodiments. Further, new technical features can be formed by combining the technical means disclosed in the embodiments.

What is claimed is:

1. An image forming apparatus comprising:

a heat source;

a fixing belt that is heated by the heat source to thermally fix a color material to each of a plurality of pieces of paper in sequence;

an operation acceptor that allows a user to specify a fixation degree, from a plurality of fixation degrees, for fixation of the color material to the plurality of pieces of paper, and to specify a type of paper from a plurality of types of paper; and one or more controllers that:

cause each of the plurality of pieces of paper to pass through the fixing belt in sequence at a control paper feed amount of a number of pieces of paper per unit of time, and determine the control paper feed amount based on the fixation degree specified by the user and the type of paper specified by the user.

2. The image forming apparatus according to claim 1, further comprising:

a first temperature detector that detects a first temperature in a region, of the fixing belt, through which a paper of a minimum allowable size passes; and a second temperature detector that detects a second temperature in an end region; of the fixing belt, the end region being located outside a maximum allowable size, wherein the control paper feed amount is further determined such that the first temperature is a temperature at which the color material is fixable to each of the plurality of pieces of paper, and the second temperature is a temperature that does not exceed a control threshold temperature.

3. The image forming apparatus according to claim 2, wherein:

the heat source is caused to generate heat at a target temperature; and the control paper feed amount is further determined by a ratio according to the fixation degree relative to a reference paper feed amount that is determined based on the target temperature and the second temperature.

4. The image forming apparatus according to claim 3, wherein:

in a case that the fixation degree indicates that the fixation for the color material is to be increased above a reference fixation degree, the control paper feed amount is set to be less than the reference paper feed amount, and in a case that the fixation degree indicates that the fixation for the color material is to be decreased below the reference fixation degree, the control paper feed amount is set to be more than the reference paper feed amount.

5. The image forming apparatus according to claim 3, wherein the fixation degree is indicated by an amount of change in the target temperature.

6. The image forming apparatus according to claim 1, wherein the one or more controllers determine the control paper feed amount further by determining a paper feed interval according to the fixation degree.

7. The image forming apparatus according to claim 1, further comprising an image inputter that acquires a print job, wherein the one or more controllers cause each of the plurality of pieces of paper to pass through the fixing belt in sequence at the control paper feed amount per unit of time, such that an image represented by each of a plurality of print pages included in the print job is sequentially formed on each of the plurality of pieces of paper.

8. The image forming apparatus according to claim 1, wherein the one or more controllers determine the control paper feed amount further based on a temperature and humidity of an environment of the image forming apparatus.

9. The image forming apparatus according to claim 1, wherein the operation acceptor allows the user to select a candidate, from a plurality of candidates, that indicates the fixation degree, the plurality of candidates being indicated by at least one of numerical values and character strings.

* * * * *